C. C. FARMER.
FLUID PRESSURE REGULATOR.
APPLICATION FILED JUNE 14, 1909.
1,031,173.
Patented July 2, 1912.
2 SHEETS—SHEET 1.
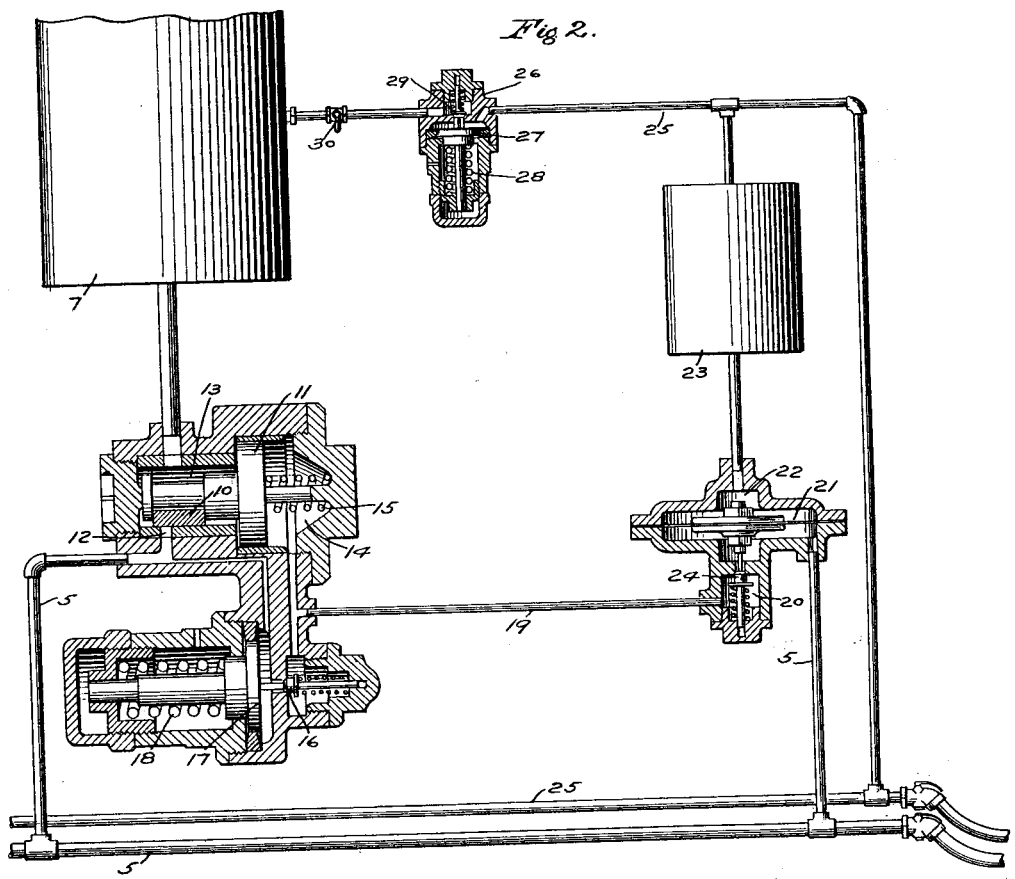
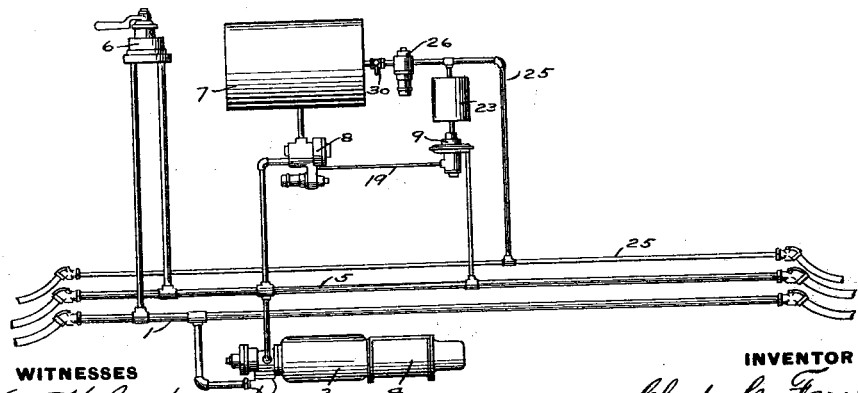
WITNESSES
Wm. M. Cady
J. F. Custer
INVENTOR
Clyde C. Farmer
by E. H. Wright
Att'y.

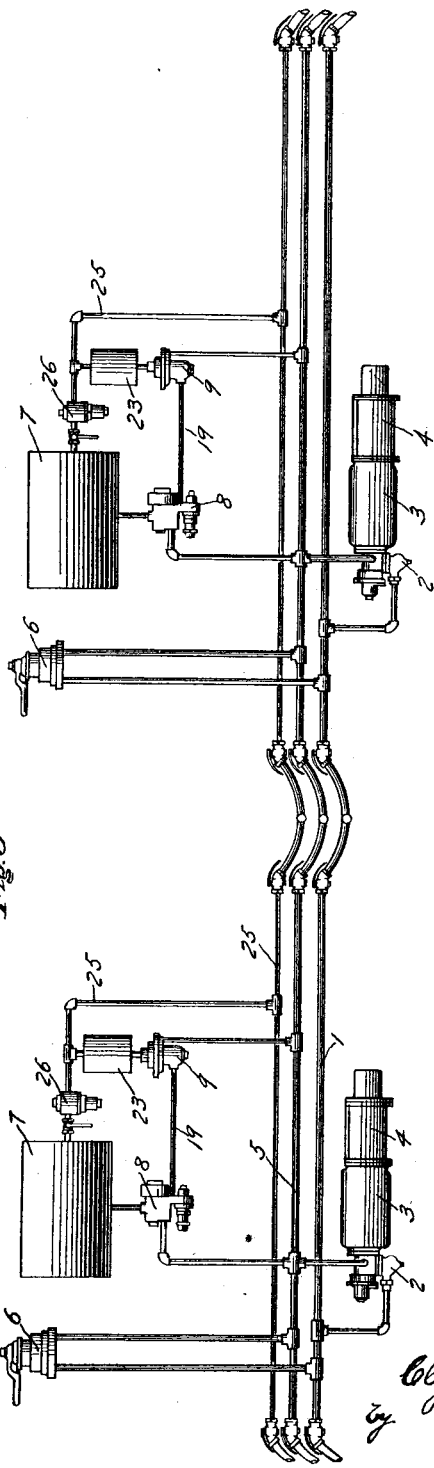

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE REGULATOR.

1,031,173.      Specification of Letters Patent.      Patented July 2, 1912.

Application filed June 14, 1909. Serial No. 501,903.

*To all whom it may concern:*

Be it known that I, CLYDE C. FARMER, a citizen of the United States, residing at Chicago, in the county of Cook and State of Illinois, have invented new and useful Improvements in Fluid-Pressure Regulators, of which the following is a specification.

This invention relates to fluid pressure regulators, and is more particularly in the nature of an improvement upon the construction covered in my prior Patent No. 920,447, dated May 4, 1909.

Devices of the above character are employed for controlling the flow of fluid from a source of high pressure to a low pressure pipe line or receptacle for the purpose of maintaining the pressure in the low pressure pipe between certain predetermined maximum and minimum limits.

The chief object of the invention covered in my above mentioned prior patent is to provide an improved fluid pressure regulator in which only a slight reduction in pressure in the low pressure receptacle is sufficient to cause the full and prompt opening of the feed port, while the feed port remains substantially fully open until the pressure reaches nearly or quite the desired degree at which the valve is adjusted to close, thus securing a much more sensitive and accurate operation of the mechanism. For accomplishing this object the mechanism comprises broadly a main valve, a piston for operating the valve to supply fluid to the low pressure pipe line, a regulating valve for governing the pressure on one side of said piston, a diaphragm subject on one side to the low outlet pressure and on the opposite side to the pressure of a maintaining chamber for operating said regulating valve, the maintaining chamber being preferably charged by means of a second regulating valve operated by a diaphragm subject to the opposing pressures of an adjustable spring and the low outlet pressure.

Fluid pressure regulators of the above character are more particularly designed for use as a feed valve device for fluid pressure brake systems and when so used, in some cases, the low pressure pipe extends through the train and is commonly known as the control pipe line. It is found that when the feed valve is open supplying air to the control pipe line, the pressure of fluid flowing to the pipe line is slightly higher than the pressure of fluid flowing to the regulating diaphragm of the second regulating valve, so that the feed valve is apt to be held open a little longer than necessary to charge the control line to the normal pressure. By reason of this, the maintaining chamber of the controlling device sometimes becomes slightly overcharged from the excess of pressure in the control line and thereby the controlling valve diphragm and valve operate the feed valve mechanism to supply air to the control pipe line at a correspondingly higher pressure. This action may be repeated each time the feed valve operates, gradually raising the pressure in the maintaining chamber until the same builds up even to main reservoir pressure.

One object of my present invention is to provide means for maintaining the pressure in the maintaining chamber of the feed valve controlling device substantially constant regardless of fluctuations in pressure in the low pressure pipe line or receptacle.

Where two or more pressure regulating devices are connected up in a train, another feature of my improvement contemplates providing a pipe line extending through the train and means for charging the same from a source of pressure to a predetermined degree so as to supply air at a uniform pressure to the maintaining chambers of all the regulating devices in the train for the purpose of insuring the substantially simultaneous action of all the feed valves, thereby compelling uniform labor of the air pumps.

In the accompanying drawing; Figure 1 is a diagrammatic view of a car air brake equipment with my invention applied thereto; Fig. 2 a sectional view of a pressure regulating apparatus embodying my improvement; and Fig. 3 a diagrammatic view of air brake equipments for two cars coupled together, showing my improvement applied thereto.

In Fig. 1 of the drawing, the pressure regulating apparatus is shown applied to a car air brake equipment comprising a train brake pipe 1, triple valve 2, auxiliary reservoir 3, brake cylinder 4, control pipe line 5, brake valve 6, main reservoir 7, and feed valve 8, which apparatus may all be of the usual construction.

The feed valve may be of the usual slide valve type comprising, as shown in Fig. 2, a main valve 10 for controlling the supply of air from the main reservoir 7 through feed port 12 to the control pipe outlet, or low pressure line 5, a piston 11 subject on one side to main reservoir pressure in valve chamber 13 and on the opposite side to the pressure in chamber 14, for operating the valve 10, and a spring 15 for normally holding the valve 10 in its closed position.

As in my prior application hereinbefore mentioned, the feed valve piston chamber 14 is connected by a pipe 19 to a chamber 20 of the controlling device 9. This controlling device comprises a regulating diaphragm 21 subject on one side to the pressure of the low pressure pipe 5 and on the opposite side to the pressure of a maintaining chamber 22 and communicating reservoir 23, and a valve 24 operated by said diaphragm for controlling communication from piston chamber 14, through pipe 19 and chamber 20 to the low pressure pipe 5.

According to my above mentioned prior application, the maintaining chamber 22 and reservoir 23 are charged from the low pressure line through a communicating passage in the controlling valve device, this passage being provided with a check valve to prevent back flow from the regulating chamber to the low pressure pipe.

The fluid under pressure in the maintaining chamber 22 is supplied thereto, according to my prior application, by the operation of a diaphragm 17, subject on one side to the pressure of an adjustable spring 18 and on the opposite side to the pressure in the control pipe line 5 and a valve 16 operated by the diaphragm 17 to vent air from one side of piston 11 and thereby cause the valve 10 to open and supply air to the control pipe line and thence through the by-pass around diaphragm 21 to chamber 22. With my present construction, the maintaining chamber is charged independently of the pressure in the low pressure receptacle, and preferably I provide a pipe 25 communicating with the reservoir 23 and supplied with fluid from the main reservoir 7 or other source of high pressure through a reducing valve device 26, the reducing valve having a diaphragm 27 subject to the opposing pressures of an adjustable spring 28 and the pressure in reservoir 23 and the maintaining chamber 22, for operating a valve 29 controlling the admission of fluid from the main reservoir 7 to the pipe 25. It will thus be seen that by this means the pressure in the maintaining chamber is kept substantially constant at a predetermined pressure according to the adjustment of spring 28. The controlling device is thus governed at all times by a practically uniform and constant pressure and is not affected by fluctuations of pressure in the low pressure line.

According to another feature of my improvement the pipe 25 may extend throughout the train and the maintaining chambers of other controlling devices upon cars of the train may be connected thereto, so that all the feed valves are governed by the same constant pressure, a cut out cock 30 being interposed between the main reservoir 7 and the reducing valve 26 so as to cut off the admission of air from the main reservoir through the reducing valve on all cars except one, preferably the head car. Thus one reducing valve supplies and maintains a constant pressure in the pipe line 25 and consequently in the maintaining chambers of all the feed valve controlling devices. By this means the simultaneous action of all the feed valves in the train is secured and thus as each main reservoir supplies its quoto of fluid under pressure, the uniform action of the pumps is obtained.

The signal pipe line heretofore employed in connection with train equipments for controlling fluid pressure operated signals may be employed as the supply pipe line for maintaining the pressure in the maintaining chambers of the feed valve controlling devices, thus avoiding the necessity for installing an additional pipe line through the train, as will be apparent.

The regulating valve 16 and its diaphragm 17 may be dispensed with and the feed valve piston 11 controlled entirely by the controlling device, though in some cases it may be desirable to retain same, as the diaphragm 17 is not so sensitive as the diaphragm 21 of the controlling device and consequently a greater range between the maximum and minimum pressures may be secured, so that while all the feed valves are opened simultaneously by the action of the controlling devices, the closing is delayed according to the more sluggish action of the diaphragms 17.

Having now described my invention, what I claim as new and desire to secure by Letters Patent, is:—

1. The combination with a source of fluid under pressure, of a fluid pressure regulator comprising a main valve, a piston for operating same, a regulating valve for governing the pressure on one side of said piston, a diaphragm subject to the opposing pressures of the outlet pressure and a constant pressure for operating said regulating valve, and means for supplying fluid to maintain said constant pressure independently of the degree of outlet pressure.

2. A fluid pressure regulator comprising a source of fluid under pressure, a main valve for controlling the flow of fluid from said source to an outlet receptacle, a piston for operating said main valve, a regulating valve for governing the pressure on one side of said piston, a diaphragm subject to the opposing pressures of the outlet pressure and a pressure adapted to be maintained substantially constant for operating said regulating valve, and a maintaining valve mechanism subject on one side to the pressure to be maintained constant and on the opposite side to the pressure of an adjustable spring for supplying fluid to maintain said pressure constant.

3. A fluid pressure regulator comprising a source of fluid pressure, a low pressure receptacle, a main valve for supplying air from said source to said receptacle, a piston for operating said main valve, a regulating valve for governing the pressure on one side of said piston, a maintaining chamber, a diaphragm subject to the opposing pressures of said outlet receptacle and said maintaining chamber for operating said regulating valve, and a maintaining valve mechanism subject to the opposing pressures of the maintaining chamber and an adjustable spring and adapted to supply fluid to said maintaining chamber to maintain a substantially constant degree of pressure therein.

4. A fluid pressure regulator comprising a source of fluid under pressure, a low pressure outlet receptacle, a main valve for controlling the supply of fluid from said source to said receptacle, a piston for operating said main valve, a regulating valve for governing the pressure on one side of said piston, a maintaining chamber, a diaphragm subject to the opposing pressures of said outlet receptacle and said maintaining chamber for operating said regulating valve, a maintaining valve for controlling the supply of fluid under pressure to said maintaining chamber, and a movable abutment subject to the opposing pressures of the maintaining chamber and an adjustable spring for operating said maintaining valve.

5. The combination with a common receptacle and a plurality of fluid pressure regulators adapted to supply fluid to said common receptacle and each subject to the pressure of said common receptacle, of means for maintaining a predetermined degree of pressure on said regulators to oppose the pressure of said common receptacle.

6. The combination with a plurality of fluid pressure regulators each comprising a main valve, a piston for operating same, a regulating valve for governing the pressure on one side of said piston, and a diaphragm subject on one side to the pressure of fluid to be regulated for operating said regulating valve, of a pipe line for supplying fluid to the opposite side of the diaphragm of each pressure regulator and a reducing valve device for limiting the pressure in said pipe line to a predetermined degree.

7. A fluid pressure regulator comprising an outlet pressure receptacle, a feed valve device for supplying air to maintain the outlet pressure at a predetermined degree, a maintaining chamber, means subject to the opposing pressures of the outlet receptacle and the maintaining chamber for governing the operation of said feed valve device, and a valve mechanism subject to the pressure in said maintaining chamber for maintaining the pressure in said chamber at a substantially constant degree of pressure.

In testimony whereof I have hereunto set my hand.

CLYDE C. FARMER.

Witnesses:
S. J. KIDLER,
A. M. CLEMENTS.

---

Copies of this patent may be obtained for five cents each, by addressing the "Commissioner of Patents, Washington, D. C."